(12) United States Patent
Cho et al.

(10) Patent No.: US 7,975,467 B2
(45) Date of Patent: Jul. 12, 2011

(54) APPARATUS FOR DRIVING BODY WITH THREE-DEGREE OF FREEDOM ANGULAR MOTION

(75) Inventors: Sung-Jin Cho, Daejeon (KR); Eul-Gon Kim, Daejeon (KR); Hyung-Sik Lee, Daejeon (KR)

(73) Assignee: Agency for Defense Development, Daejeon (KR)

( * ) Notice: Subject to any disclaimer, the term of this patent is extended or adjusted under 35 U.S.C. 154(b) by 1057 days.

(21) Appl. No.: 11/818,029

(22) Filed: Jun. 13, 2007

(65) Prior Publication Data

US 2008/0203189 A1 Aug. 28, 2008

(30) Foreign Application Priority Data

Feb. 28, 2007 (KR) ........................ 10-2007-0020607

(51) Int. Cl.
*F02K 9/84* (2006.01)
(52) U.S. Cl. ...................................... 60/232; 239/265.19
(58) Field of Classification Search .................. 60/200.1, 60/201, 770, 232; 239/265.19
See application file for complete search history.

(56) References Cited

U.S. PATENT DOCUMENTS

| | | | | | |
|---|---|---|---|---|---|
| 3,142,153 | A | * | 7/1964 | Hensley | ............... 239/265.35 |
| 3,436,021 | A | * | 4/1969 | Walton et al. | ............ 239/265.35 |
| 3,486,698 | A | * | 12/1969 | Cologna | ................. 239/265.25 |
| 4,274,610 | A | * | 6/1981 | Bastian | ........................ 244/3.22 |
| 4,506,832 | A | | 3/1985 | Faupell | |
| 4,691,659 | A | * | 9/1987 | Ito et al. | .................... 114/144 R |
| 7,614,816 | B2 | * | 11/2009 | Lee et al. | ...................... 403/116 |

FOREIGN PATENT DOCUMENTS

| | | |
|---|---|---|
| EP | 1 188 668 A1 | 3/2002 |
| FR | 1507987 A | 12/1967 |
| GB | 1169342 | 1/1967 |
| JP | 11013542 | 1/1999 |

OTHER PUBLICATIONS

French Office Action dated Sep. 20, 2010 for Application No. FR 0755972.

* cited by examiner

*Primary Examiner* — Ehud Gartenberg
*Assistant Examiner* — Vikansha S Dwivedi
(74) *Attorney, Agent, or Firm* — Scully, Scott, Murphy & Presser, P.C.

(57) ABSTRACT

An apparatus for driving a body with 3-degree of freedom angular motion, comprises: a body connected to a fixing part so as to be rotatable centering around a pitch axis, a yaw axis, and a roll axis; a pitch axis driving unit for rotating the body centering around the pitch axis; and a yaw axis driving unit for rotating the body centering around the yaw axis. Since one of the pitch axis driving unit and the yaw axis driving unit restricts the body from rotating centering around the roll axis fixed to the body, the conventional roll-rotation restricting link is not needed between the body and the fixing part. Accordingly, a size of the apparatus is reduced.

17 Claims, 5 Drawing Sheets

APPARATUS FOR DRIVING BODY WITH THREE-DEGREE OF FREEDOM ANGULAR MOTION

RELATED APPLICATION

The present disclosure relates to subject matter contained in priority Korean Application No. 10-2007-0020607, filed on Feb. 28, 2007, which is herein expressly incorporated by reference in its entirety.

BACKGROUND OF THE INVENTION

1. Field of the Invention

The present invention relates to an apparatus for driving a body, and more particularly, to an apparatus for driving a body with 3-degree of freedom angular motion capable of driving a body to a predetermined direction, the body coupled to a fixing part and rotatable with 3-degree of freedom centering around a pitch axis, a yaw axis, and a roll axis.

2. Description of the Background Art

A rocket motor for a flying object is provided with a nozzle through which combustion gas is discharged thus to generate a thrust at a combustion pipe thereof. In order to control the flying object, the nozzle of the motor has to be rotated to convert a direction of the thrust generated therefrom. The nozzle for converting the direction of the thrust is connected to a fixing part such as a combustion pipe dome by a ball-socket joint.

However, if the nozzle is connected to the fixing part by the ball-socket joint, each rotation thereof centering around a pitch axis and a yaw axis is not controlled by each driving unit since the nozzle rotates centering around a roll axis in an axial direction.

Accordingly, a link or a driving unit for restricting the nozzle from rotating centering around the roll axis is required. A method for installing a roll-rotation restricting link has been disclosed in U.S. Pat. No. 4,506,832. According to the method, a roll-rotation restricting link for restricting a nozzle from rotating centering around a roll axis is disclosed.

However, the method according to the U.S. Pat. No. 4,506,832 has following problems.

Since the roll-rotation restricting link has to be disposed between a fixing part and a nozzle and the fixing part has a limited space, the number of processes for assembling a flying object is increased thus to cause an entire assembly to be complicated.

Furthermore, since the number of components is increased, a manufacturing cost is increased.

SUMMARY OF THE INVENTION

Therefore, an object of the present invention is to provide an apparatus for driving a body with 3-degree of freedom angular motion capable of implementing 2-degree of freedom angular motion by restricting a body connected to a fixing part and rotatable with 3-degree of freedom from rotating centering around a roll axis.

To achieve these and other advantages and in accordance with the purpose of the present invention, as embodied and broadly described herein, there is provided with an apparatus for driving a body with 3-degree of freedom angular motion, comprising: a body connected to a fixing part so as to be rotatable centering around a pitch axis, a yaw axis, and a roll axis; a pitch axis driving unit for rotating the body centering around the pitch axis; and a yaw axis driving unit for rotating the body centering around the yaw axis, wherein one of the pitch axis driving unit and the yaw axis driving unit restricts the body from rotating centering around the roll axis fixed to the body.

The pitch axis driving unit restricts the body from rotating centering around the roll axis fixed to the body.

The pitch axis driving unit includes: a pitch axis cylinder fixed to the fixing part; a pitch axis piston reciprocatingly disposed at the pitch axis cylinder; and a pitch axis connecting rod having one end connected to the body so as to restrict the body from rotating centering around the roll axis fixed to the body, and another end connected to the pitch axis piston by a ball joint.

Preferably, the one end of the pitch axis connecting rod is connected to the body by a revolution joint.

The yaw axis driving unit includes: a yaw axis cylinder fixed to the fixing part; a yaw axis piston reciprocatingly disposed at the yaw axis cylinder; and a yaw axis connecting rod having both ends respectively connected to the body and the pitch axis piston by a ball joint.

Preferably, a pitch axis bracket to which the revolution joint is connected, and a yaw axis bracket to which the ball joint of one end of the yaw axis connecting rod is connected are provided at the body. The pitch axis bracket and the yaw axis bracket are disposed on an outer circumferential surface of the body so as to be spaced from each other by 90° on the basis of the roll axis.

The pitch axis connecting rod and the yaw axis connecting rod projected to the plane perpendicular to the roll axis are disposed to have an angle of 90° therebetween.

The fixing part includes: a first fixing part for fixing the body by a ball-socket joint; and a second fixing part fixed to the first fixing part, provided with the pitch axis driving unit and the yaw axis driving unit, and having a cavity for receiving the body therein.

The body is connected to the first fixing part by a ball-socket joint. The body may be a nozzle for a flying object.

According to another aspect of the present invention, there is provided an apparatus for driving a body with 3-degree of freedom angular motion, comprising: a body connected to a fixing part by a ball-socket joint so as to be rotatable centering around a pitch axis, a yaw axis, and a roll axis; a pitch axis driving unit for rotating the body centering around the pitch axis, and restricting the body from rotating centering around the yaw axis; a driving source for driving the pitch axis driving unit and the yaw axis driving unit; a controlling valve connected to the driving source for selectively transmitting a driving force generated from the driving source to the pitch axis driving unit and the yaw axis driving unit; and a controller for controlling the driving source and the controlling valve so as to rotate the body to a preset position by the pitch axis driving unit and the yaw axis driving unit.

The apparatus for driving a body with 3-degree of freedom angular motion may further comprise: a first sensor for sensing a position of the pitch axis piston and outputting to the controller; and a second sensor for sensing a position of the yaw axis piston and outputting to the controller. The controller controls the driving source and the controlling valve based on the position information outputted from the first sensor and the second sensor. As the driving source, a hydraulic pump may be used.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, an apparatus for driving a body with 3-degree of freedom angular rotation according to a first embodiment of the present invention will be explained with reference to FIGS. 1 to 6.

Figure 1:
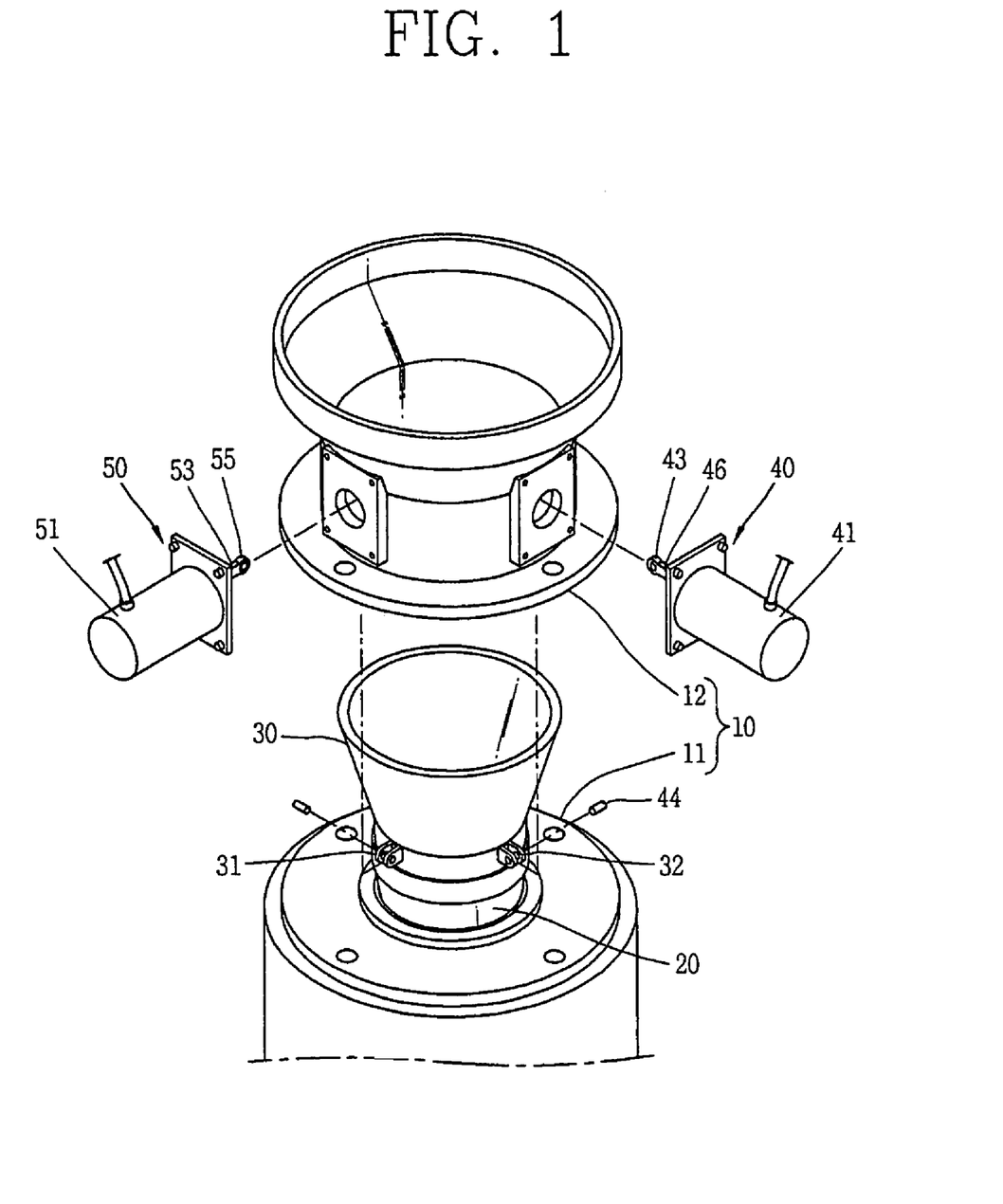
FIG. 1 is an exploded perspective view schematically showing an apparatus for driving a body with 3-degree of freedom angular rotation according to a first embodiment of the present invention.
Figure 2:
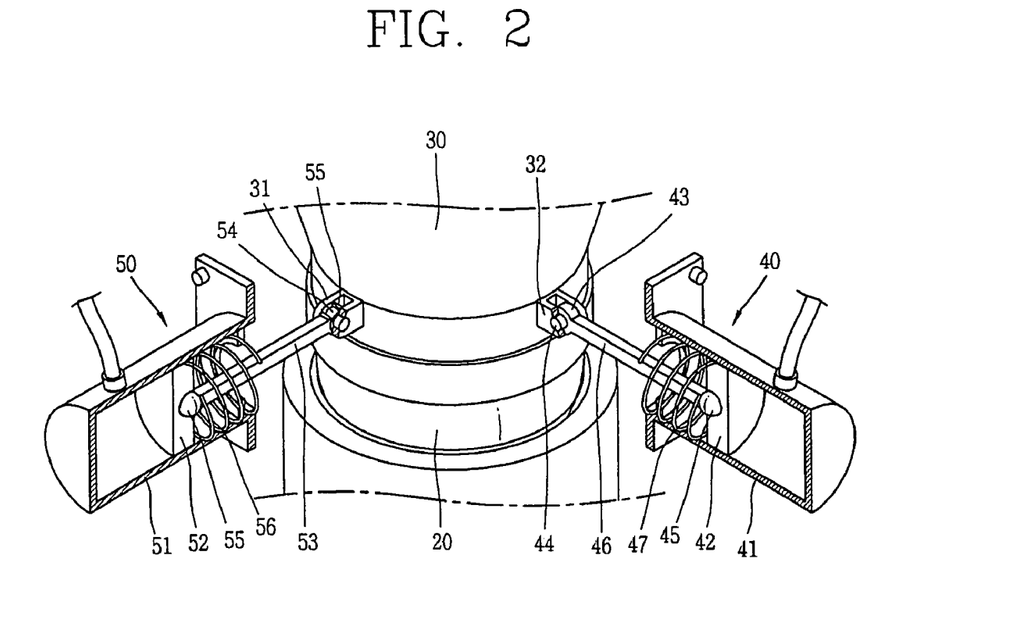
FIG. 2 is a cut-perspective view showing the apparatus for driving a body with 3-degree of freedom angular rotation of FIG. 1.

The apparatus for driving a body 30 connected to a fixing part 10 by a ball-socket joint 20 comprises a pitch axis driving unit 40, a yaw axis driving unit 50, a driving source 60, a controlling valve 61, a first sensor 70, a second sensor 80, and a controller 90.

The fixing part 10 includes a first fixing part 11 for fixing the body 30 by the ball-socket joint 20, and a second fixing part 12 for fixing the pitch axis driving unit 40 and the yaw axis driving unit 50.

The second fixing part 12 is fixed to the first fixing part 11 by a coupling means such as a bolt, and has a cylindrical shape having a cavity therein for inserting the body 30. The first fixing part 11 for fixing the body 30, and the second fixing part 12 for fixing the pitch axis driving unit 40 and the yaw axis driving unit 50 are individually formed in the present invention. However, the first fixing part 11 and the second fixing part 12 may be integrally formed to each other.

The body 30 is connected to the first fixing part 11 by the ball-socket joint 20 so as to be rotatable centering around a pitch axis ($X_G$), a yaw axis ($Y_G$), and a roll axis ($Z_G$). However, rotating the body 30 such as a nozzle for a flying object centering around the roll axis ($Z_G$) does not serve to control flying of the flying object. Furthermore, since a position of a pivot point fixed on the body 30 to rotate the body 30 centering around the pitch axis ($X_G$) and the yaw axis ($Y_G$) is changed, rotating the body 30 centering around the roll axis ($Z_G$) causes controlling the rotation of the body 30 centering around the pitch axis ($X_G$) and the yaw axis ($Y_G$) to be difficult. Accordingly, in the present invention, the pitch axis driving unit 40 and the yaw axis driving unit 50 are installed at the second fixing part 12 so as to restrict the body 30 from rotating centering around the roll axis ($Z_G$) disposed in a longitudinal direction of the body 30.

The pitch axis driving unit 40 includes a pitch axis cylinder 41, a pitch axis piston 42, and a pitch axis connecting rod 46.

The pitch axis cylinder 41 is fixed to the second fixing part 12, and is connected to the driving source 60 for driving the pitch axis piston 42. A spring 47 for pressurizing the pitch axis piston 42 in one direction is disposed in the pitch axis cylinder 41. As the driving source, a hydraulic pump may be used.

The pitch axis piston 42 is disposed at the pitch axis cylinder 41 in the yaw axis ($Y_G$) direction, and is reciprocated in the pitch axis cylinder 41 by a driving force transmitted from the driving source 60 and an elastic force of the spring 47. When the driving force transmitted from the driving source 60 is equal to the elastic force of the spring 47, the pitch axis piston 42 maintains a fixed state.

Figure 3:
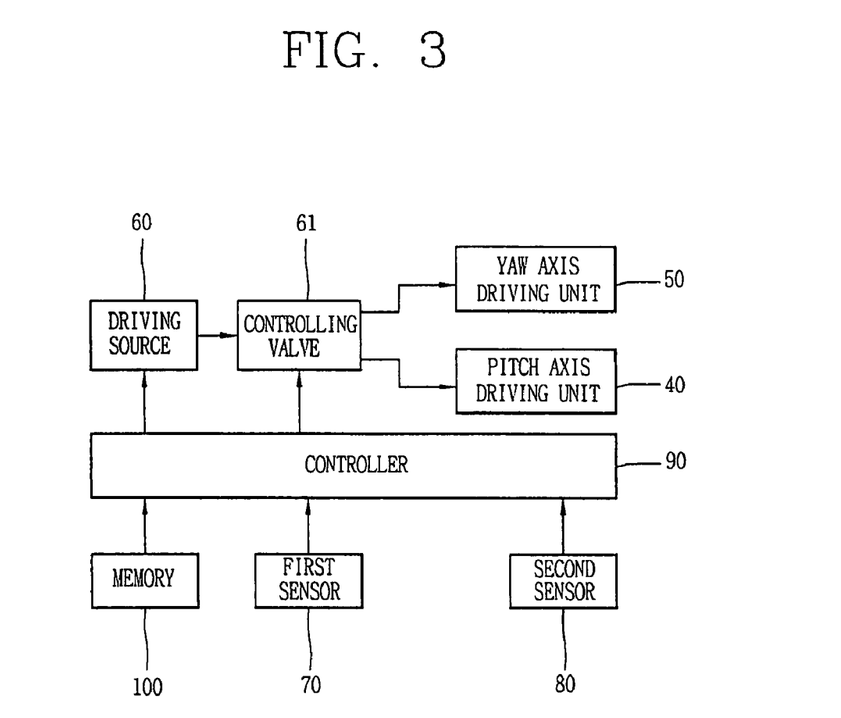
FIG. 3 is a block diagram showing a process for controlling the apparatus for driving a body with 3-degree of freedom angular rotation of FIG. 1.

A position of the pitch axis piston 42 is detected by the first sensor 70. The first sensor 70 is electrically connected to the controller 90, and outputs position information for the pitch axis piston 42 to the controller 90. The pitch axis connecting rod 46 serves to transmit a driving force for rotating the body 30 centering around the pitch axis ($X_G$) to the body 30. One end of the pitch axis connecting rod 46 is connected to a pitch axis bracket 31 by a revolution joint 43.

The one end of the pitch axis connecting rod 46 can rotate only centering around a rotation axis 44 of the revolution joint 43. That is, the revolution joint 43 serves to restrict the body 30 from rotating centering around the roll axis ($Z_G$) fixed to the body 30. The body 30 can rotate centering around the pitch axis ($X_G$) and the yaw axis ($Y_G$) by the pitch axis driving unit 40 and the yaw axis driving unit 50, without rotating centering around the roll axis ($Z_G$). Since the body 30 is restricted from rotating centering around the roll axis ($Z_G$) by the pitch axis driving unit 40, the conventional roll-rotation restricting link for restricting the body from rotating the roll axis is not required. Accordingly, the number of components is reduced, manufacturing processes are simplified, and the size of the apparatus is reduced. Another end of the pitch axis connecting rod 46 is connected to the pitch axis piston 42 by a ball-socket joint 45.

The yaw axis driving unit 50 includes a yaw axis cylinder 51, a yaw axis piston 52, and a yaw axis connecting rod 53. The yaw axis driving unit 50 has the same configuration and operation as the pitch axis driving unit 40 except a configuration to connect one end of the yaw axis connecting rod 53 to the body 30, and an installation position thereof.

More concretely, the yaw axis cylinder 51 is fixed to the second fixing part 12, and is connected to the driving source 60. A spring 56 for pressurizing the yaw axis piston 52 in one direction is disposed in the yaw axis cylinder 51.

The yaw axis piston 52 is disposed at the yaw axis cylinder 51 in the pitch axis ($X_G$) direction, and is reciprocated in the yaw axis cylinder 51 by a driving force transmitted from the driving source 60 and an elastic force of the spring 56. When the driving force transmitted from the driving source 60 is equal to the elastic force of the spring 56, the yaw axis piston 52 maintains a fixed state.

A position of the yaw axis piston 52 is detected by the second sensor 80. The second sensor 80 is electrically connected to the controller 90, and outputs position information for the yaw axis piston 52 to the controller 90.

The yaw axis connecting rod 53 serves to transmit a driving force for rotating the body 30 centering around the yaw axis ($Y_G$) to the body 30. One end of the yaw axis connecting rod 53 is connected to a yaw axis bracket 32 provided at the body 30, and another end thereof is connected to the yaw axis piston 52. Both ends of the yaw axis connecting rod 53 are connected to the yaw axis bracket 32 and the yaw axis piston 52 by ball joints 54 and 55, respectively. The pitch axis bracket 31 and the yaw axis bracket 32 are disposed on an outer circumferential surface of the body 30 so as to be spaced from each other by 90° on the basis of the roll axis ($Z_G$). The pitch axis connecting rod 46 and the yaw axis connecting rod 53 perpendicular to the roll axis ($Z_G$) are disposed to have an angle of 90° therebetween, which is preferable in applying a force thereto. However, even if the pitch axis connecting rod 46 and the yaw axis connecting rod 53 are disposed to have an angle rather than 90° therebetween, rotation of the body 30 can be controlled.

When the pitch axis connecting rod 46 and the yaw axis connecting rod 53 are fixed, the body 30 is restricted from rotating centering around the roll axis ($Z_G$), the pitch axis ($X_G$), and the yaw axis ($Y_G$).

Figure 4:
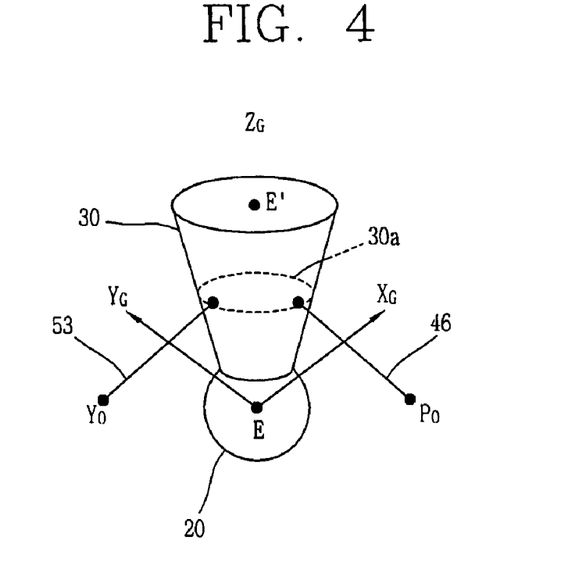
FIG. 4 is a conceptual view showing a moving path of the body of FIG. 1.

When the body 30 is operated by the pitch axis piston 42 under a state the yaw axis piston 52 is fixed, one end of the pitch axis piston 42 rotates centering around only a rotation axis 44 parallel with the pitch axis ($X_G$) by the revolution joint 43. Accordingly, the body 30 rotates centering around the pitch axis ($X_G$). However, since the body 30 is restricted from moving in a longitudinal direction of the yaw axis piston 52 by the yaw axis piston 52, the body 30 performs another rotation as well as the rotation centering around the pitch axis ($X_G$). More concretely, by driving only the pitch axis piston 42, the body 30 rotates centering around a line ($EP_0$) formed by connecting a rotation center of the body 30 (E, the center of the ball-socket joint 20) and a pivot point ($P_0$) of another end of the pitch axis piston 42. In order to rotate the body 30 centering around only the pitch axis ($X_G$), the yaw axis piston 52 has to be operated to compensate for another rotation of the body 30.

The compensation for another rotation of the body 30 may be equally applied to operate the body 30 by the yaw axis piston 52 under a state that the pitch axis piston 42 is fixed. More concretely, by driving only the yaw axis piston 52, the body 30 rotates centering around a line ($EY_0$) formed by connecting the rotation center of the body 30 (E) and another end ($Y_0$) of the yaw axis piston 52. In order to rotate the body 30 centering around only the yaw axis ($Y_G$), the pitch axis piston 42 has to be operated to compensate for another rotation of the body 30.

Figure 5A:
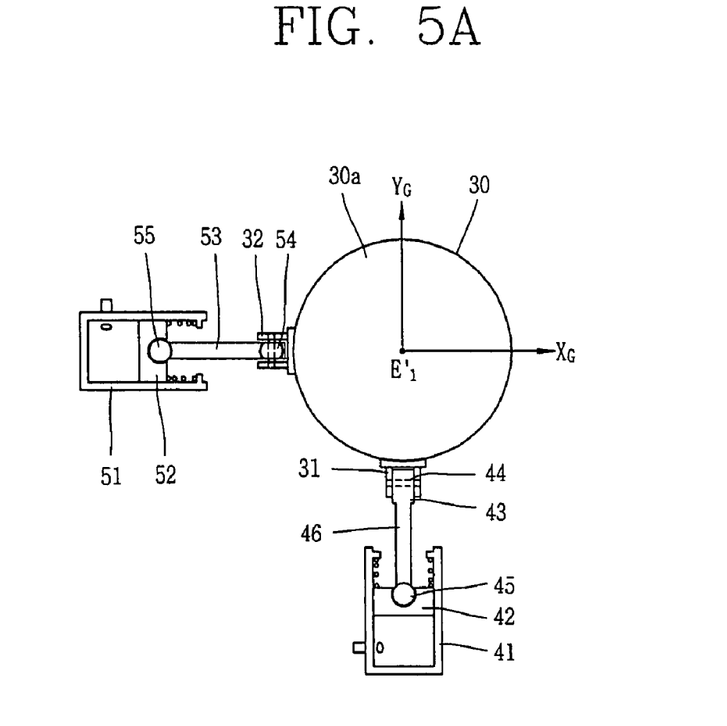
FIGS. 5A and 5B are conceptual views showing a moving path of the body of FIG. 1 when a yaw axis driving unit is operated in a state that a pitch axis driving unit is not operated.
Figure 5B:
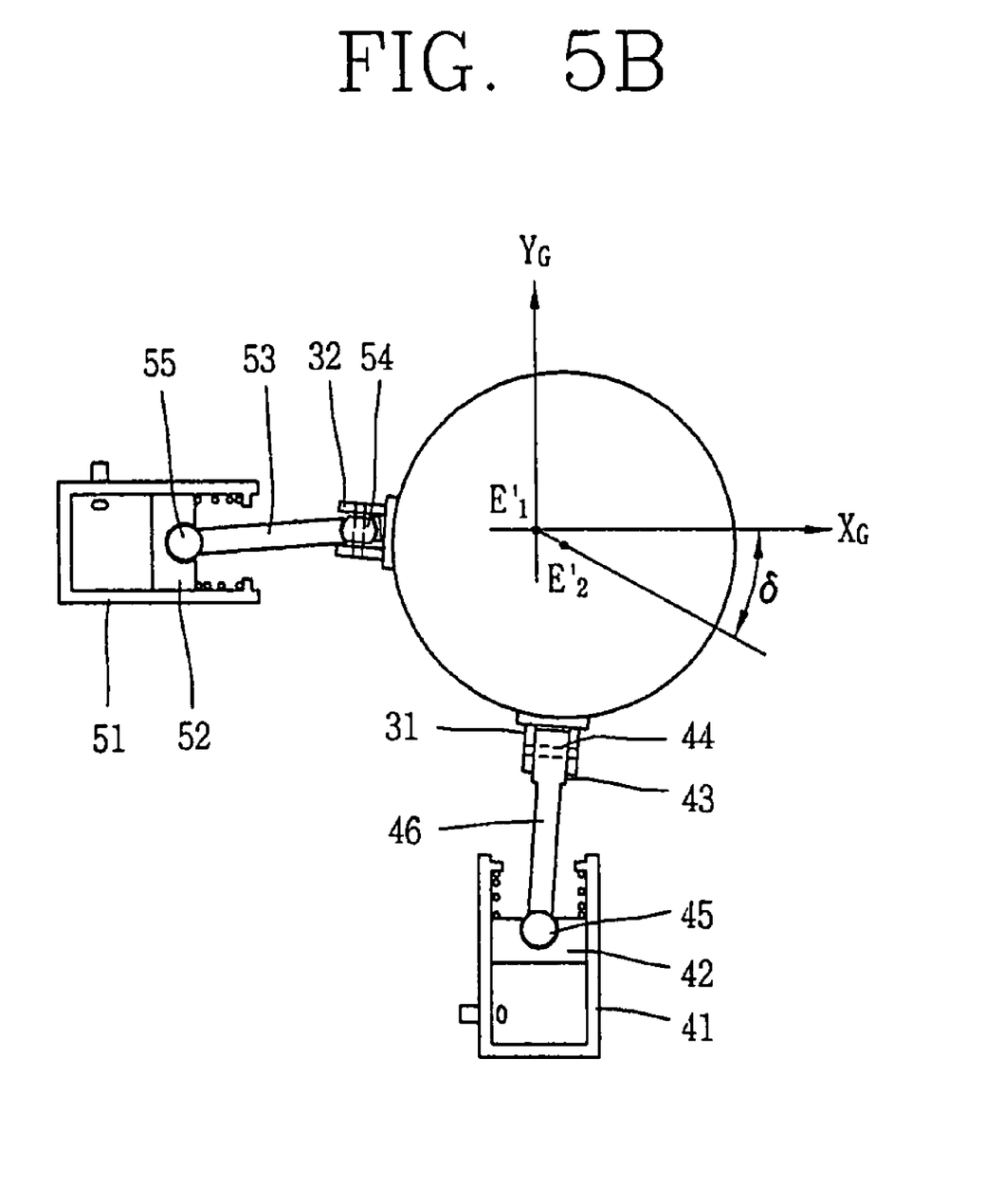

FIG. 5A is a view schematically showing an initial state of the body 30 before being driven, and FIG. 5B is a view schematically showing a later state of the body 30 after being driven.

Referring to FIGS. 5A and 5B, a section of the body 30 including the pitch axis bracket 31 and the yaw axis bracket 32 perpendicular to the roll axis ($Z_G$) is referred to as an 'enlarged part 30a'. When the yaw axis piston 52 is operated under a state that the pitch axis piston 42 is fixed, a center point ($E_1'$) of the enlarged part 30a of the body 30 does not linearly move along the pitch axis ($X_G$) but moves to a point ($E2'$) on a line inclined from the pitch axis ($X_G$) by a certain angle ($\delta$). The reason is why the pitch axis piston 42 has been fixed.

As aforementioned, both the pitch axis piston 42 and the yaw axis piston 52 have to be operated so as to rotate the body 30 to a preset point. Each moving distance of the pitch axis piston 42 and the yaw axis piston 52 for rotating the body 30 to a preset position is obtained by the following formulas.

Figure 6:
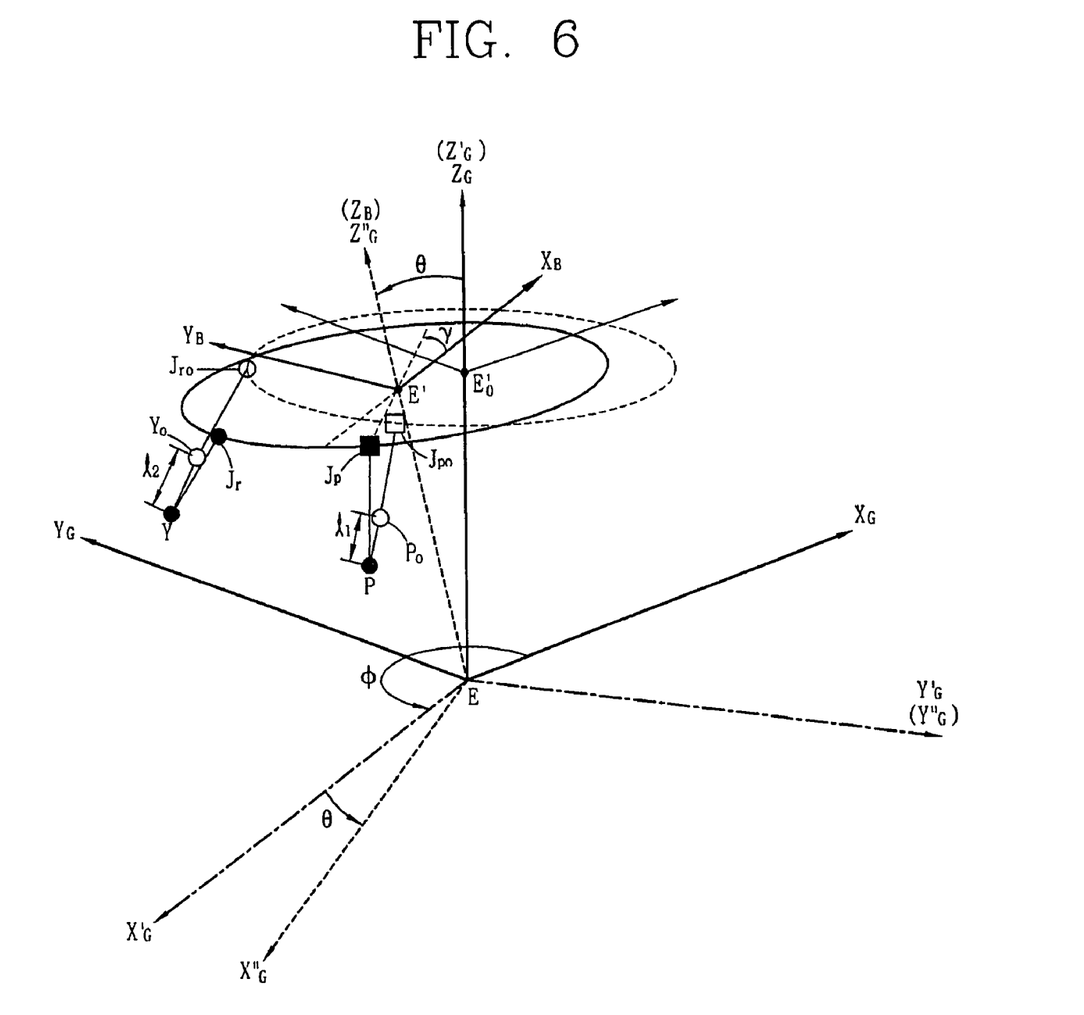
FIG. 6 is a view showing a process for calculating each moving distance of a pitch axis piston and a yaw axis piston for rotating the body of FIG. 1.

FIG. 6 is a view showing a process for calculating each moving distance of the pitch axis piston 42 and the yaw axis piston 52 so as to rotate the body 30 to a preset point. Hereinafter, parameters shown in FIG. 6 will be explained.

$X_G$, $Y_G$, $Z_G$: X-axis, Y-axis, and Z-axis on a G coordinate system, each fixed to the fixing part 10

$X_B$, $Y_B$, $Z_B$: X-axis, Y-axis, and Z-axis on a B coordinate system, each fixed to the body 30 but fixed to the fixing part 10 with respect to a rotation of the body 30 centering around the roll axis E: center point of a ball to which the body 30 is connected (rotation center point of the body 30)

$E_0'$: initial position of a center point of the enlarged part 30a $E'$: later position of the center point of the enlarged part 30a $J_{PO}$: initial position of one end of the pitch axis connecting rod 46 connected to the body 30 (initial position of the revolution joint 43)

$J_P$: later position of the one end of the pitch axis connecting rod 46 connected to the body 30 (later position of the revolution joint 43)

$J_{YO}$: initial position of one end of the yaw axis connecting rod 53 connected to the body 30 (initial position of the ball joint 54)

$J_Y$: later position of the one end of the yaw axis connecting rod 53 connected to the body 30 (later position of the ball joint 54)

$P_0$: initial position of another end of the pitch axis connecting rod 46 connected to the pitch axis piston 42 (i.e., initial position of the ball joint 45)

P: later position of the another end of the pitch axis connecting rod 46 connected to the pitch axis piston 42 (i.e., later position of the ball joint 45)

$Y_0$: initial position of another end of the yaw axis connecting rod 53 connected to the yaw axis piston 52 (i.e., initial position of the ball joint 55)

Y: later position of the another end of the yaw axis connecting rod 53 connected to the yaw axis piston 52 (i.e., later position of the ball joint 55)

$l_1$: moving distance of the pitch axis piston 42

$l_2$: moving distance of the yaw axis piston 52

Since one end of the pitch axis connecting rod 46 is connected to the body 30 by the revolution joint 43, the body 30 is restricted from rotating centering around the roll axis ($Z_G$) fixed to the body 30. Accordingly, a line (E'E) formed by connecting the center point (E') of the enlarged part 30a of the body 30 and the center point (E) of the ball, a line ($E'J_p$) formed by connecting the center point (E') of the enlarged part 30a of the body 30 and one end ($J_p$) of the pitch axis connecting rod 46, and a line (E'P) formed by connecting the center point (E') of the enlarged part 30a of the body 30 and another end (P) of the pitch axis connecting rod 46 have to be disposed on the same plane. From the above conditions, the following formula 1 is obtained.

$$(\vec{E'E}^B \times \vec{E'J_P}^B) \cdot (\vec{E'P}^B) = 0 \quad \text{[Formula 1]}$$

Since a length L of the pitch axis connecting rod 46 is not variable, the following formula 2 is obtained.

$$|\vec{PJ_P}^B|^2 = L^2 \quad \text{[Formula 2]}$$

Herein, the superscript B denotes B coordinate system.

The above vectors can be represented in the following formulas 3 to 6.

$$\vec{E'E}^B = [0, 0, -l_E]^T \quad \text{[Formula 3]}$$

$$\vec{E'J_P}^B = [-\sin\gamma \cdot y_{J_P}, \cos\gamma \cdot y_{J_P}, 0]^T \quad \text{[Formula 4]}$$

$$\overrightarrow{E'P}^B = [P_{B1}, P_{B2}, P_{B3}]^T \qquad \text{[Formula 5]}$$

$$\left|\overrightarrow{PJ_P}\right|^B = [-\sin\gamma \cdot y_{J_P} - P_{B1},\ \cos\gamma \cdot y_{J_P} - P_{B2},\ -P \qquad \text{[Formula 6]}$$

Herein, the $l_{E'}$ denotes a distance between the center point (E) of the ball and the center point (E') of the enlarged part 30a, and the $Y_{J_P}$ denotes a radius of the enlarged part 30a. The γ denotes a rotation angle of the body 30 centering around the roll axis. The body 30 is restricted from rotating centering around the roll axis ($Z_G$) fixed to the body 30, but rotates centering around a line connecting the center point (E) of the ball and another end of the pitch axis connecting rod 46, or a line connecting the center point (E) of the ball and another end of the yaw axis connecting rod 53. Accordingly, a rotation component_centering around the roll axis ($Z_G$) fixed to the fixing part 10 is generated.

The superscript T denotes a vector transpose, and $P_{B1}$, $P_{B2}$ and $P_{B3}$ denote coordinate points of another end of the pitch axis connecting rod 46 on the B coordinate system.

The formulas 1 and 2 can be summarized as the following formulas 7 and 8 with reference to the formulas 3 to 6.

$$P_{B1} \cdot \cos\gamma + P_{B2} \cdot \sin\gamma = 0 \qquad \text{[Formula 7]}$$

$$P_{B1}^2 + P_{B2}^2 + P_{B3}^2 + 2P_{B1}y_{J_P} \cdot \sin\gamma - 2P_{B2}y_{J_P} \cdot \cos\gamma + y_{J_P}^2 \qquad \text{[Formula 8]}$$

Herein, the formulas 7 and 8 can be summarized as the following formula 9 with reference to the formula of a trigonometric function of $\cos\gamma^2 + \sin\gamma^2 = 1$.

$$P_{B1}^2 + P_{B2}^2 + P_{B3}^2 - 2y_{J_P}\sqrt{P_{B1}^2 + P_{B2}^2} + y_{J_P}^2 = L^2 \qquad \text{[Formula 9]}$$

Herein, the initial position ($P_0$) of the pivot point of another end of the pitch axis connecting rod 46 on the G coordinate system is defined as (0, $P_1$, $P_2$). Also, the later position (P) of the pivot point of another end of the pitch axis connecting rod 46 on the G coordinate system is defined as (0, $T_1$, $T_2$), A moving distance of the anther end of the pitch axis connecting rod 46 from the $P_0$ to the P, that is, a moving distance of the pitch axis piston 42 is defined as $l_1$. Also, a unit vector of the pitch axis piston 42 in a direction that the pitch axis piston 42 moves is defined as (0, $dp_1$, $dp_2$), and the following formula 10 is obtained.

$$T_1 = p_1 + l_1 dp_1, \qquad \text{[Formula 10]}$$
$$T_2 = p_2 + l_1 dp_2$$

Since the later position (P) of the pivot point of another end of the pitch axis connecting rod 46 on the G coordinate system corresponds to ($P_{B1}$, $P_{B2}$, $P_{B3}$) on the B coordinate system, it is defined as the following formula 11 by a coordinate conversion using an azimuth angle (φ) and an elevation angle (θ). More specifically, the G coordinate system is converted into the G' coordinate system by rotating in the azimuth direction by (φ), and the G' coordinate system is converted into the G'' coordinate system by rotating in the elevation angle (θ). Then, the G'' coordinate system is converted into the B coordinate system by rotating in the azimuth direction by (−φ) and moving in the $Z_G$'' direction by $l_{E'}$. Herein, the φ and θ denote the azimuth angle and the elevation angle, respectively by which the body 30 rotates to a preset position.

$$\begin{bmatrix} P_{B1} \\ P_{B2} \\ P_{B3} \end{bmatrix} = \begin{bmatrix} \cos\phi & -\sin\phi & 0 \\ \sin\phi & \cos\phi & 0 \\ 0 & 0 & 1 \end{bmatrix} \begin{bmatrix} \cos\theta & 0 & -\sin\theta \\ 0 & 1 & 0 \\ \sin\theta & 0 & \cos\theta \end{bmatrix} \qquad \text{[Formula 11]}$$

$$\begin{bmatrix} \cos\phi & \sin\phi & 0 \\ -\sin\phi & \cos\phi & 0 \\ 0 & 0 & 1 \end{bmatrix} \begin{bmatrix} 0 \\ T_1 \\ T_2 \end{bmatrix} - \begin{bmatrix} 0 \\ 0 \\ l_{E'} \end{bmatrix}$$

T The following formula 12 representing a quadratic equation for the $l_1$ is obtained by summarizing the above formulas 9 to 11, $$l_1^4 + c_1 l_1^3 + c_2 l_1^2 + c_3 l_1 + c_4 = 0 \qquad \text{[Formula 12]}$$

Herein, the coefficients $c_1$, $c_2$, $c_3$ and $c_4$ are defined as the following formulas 13 to 16.

$$c_1 = 2\{2p_1 dp_1 + 2p_2 dp_2 - 2l_{E'}(dp_1 \sin\phi \sin\theta + dp_2 \cos\theta)\} \qquad \text{[Formula 13]}$$

$$c_2 = -\frac{4y_{J_P}^2}{dp_1^2 + dp_2^2}\Bigg\{(dp_1 \sin\phi \cos\theta - dp_2 \sin\theta)^2 + \qquad \text{[Formula 14]}$$
$$dp_1^2 \cos\phi^2 - \frac{1}{4}\Big(2(j_{p1}^2 + j_{p2}^2 - L^2 + p_1^2 -$$
$$2L_{E'}(p_1 \sin\phi \sin\theta + p_2 \cos\theta) + p_2^2)$$
$$2(p_1 dp_1 + 2p_2 dp_2 -$$
$$(dp_1^2 + dp_2^2) + \frac{2l_{E'}(dp_1 \sin\phi \sin\theta + dp_2 \cos\theta))^2}{y_{J_P}^2}\Bigg\}$$

$$c_3 = -\frac{4y_{J_P}^2}{dp_1^2 + dp_2^2}\Bigg\{2p_1 dp_1 \cos\phi^2 + \qquad \text{[Formula 15]}$$
$$2(p_1 \sin\phi \cos\theta - p_2 \sin\theta)(dp_1 \sin\phi \cos\theta - dp_2 \sin\theta) -$$
$$\frac{1}{2}(j_{p1}^2 + j_{p2}^2 - L^2 + p_1^2 - 2l_{E'}(p_1 \sin\phi \sin\theta + p_2 \cos\theta) +$$
$$2(p_1 dp_1 + 2p_2 dp_2 -$$
$$p_2^2) + \frac{2l_{E'}(dp_1 \sin\phi \sin\theta + dp_2 \cos\theta))}{y_{J_P}^2}\Bigg\}$$

$$c_4 = -\frac{4y_{J_P}^2}{dp_1^2 + dp_2^2}\Bigg\{\cos\phi^2 p_1^2 - \frac{1}{4y_{J_P}^2} \qquad \text{[Formula 16]}$$
$$(j_{p1}^2 + j_{p2}^2 - L^2 + p_1^2 - 2l_{E'}(p_1 \sin\phi \sin\theta + p_2 \cos\theta) + p_2^2)^2$$
$$+ (p_1 \sin\phi \cos\theta - p_2 \sin\theta)^2\Bigg\}$$

The $l_1$ is obtained by solving the quadratic equation represented by the formula 12 using the formula 12 representing the quadratic equation.

$$l_1 = \frac{-c_{1a} - \sqrt{c_{1a}^2 - 4c_{2a}}}{2} \qquad \text{[Formula 17]}$$

Herein, the $c_{1a}$ and $C_{2a}$ are defined as the following formulas 18 and 19.

$$c_{1a} = \frac{c_1 + \sqrt{c_1^2 - 4c_2 + 4y_1}}{2} \quad \text{[Formula 18]}$$

$$c_{2a} = \frac{y_1 - \sqrt{y_1^2 - 4c_4}}{2} \quad \text{[Formula 19]}$$

The $y_1$ is defined as the following formulas 20 and 21 according to a sign of D defined by the following formula 26.

$$y_1 = S + T - \frac{1}{3}a_1 \quad (D \geq 0) \quad \text{[Formula 20]}$$

$$y_1 = 2\sqrt{-Q}\cos\left(\frac{1}{3}w\right) - \frac{1}{3}a_1 \quad (D < 0) \quad \text{[Formula 21]}$$

Herein, the S, T and Q are defined as the following formulas 22 to 24.

$$S = -\left(-R - \sqrt{D}\right)^{\frac{1}{3}} \quad \text{[Formula 22]}$$

$$T = -\left(-R + \sqrt{D}\right)^{\frac{1}{3}} \quad \text{[Formula 23]}$$

$$Q = \frac{3a_2 - a_1^2}{9} \quad \text{[Formula 24]}$$

Herein, the R is defined as the following formula 25.

$$R = \frac{9a_1a_2 - 27a_3 - 2a_1^3}{54} \quad \text{[Formula 25]}$$

$$D = Q^3 + R^2 \quad \text{[Formula 26]}$$

Also, ω is defined as the following formula 27, and $\alpha_1$, $\alpha_2$ and $\alpha_3$ are defined as the following formulas 28, 29 and 30.

$$\cos w = \frac{R}{\sqrt{-Q^3}} \quad \text{[Formula 27]}$$

$$a_1 = -c_2 \quad \text{[Formula 28]}$$

$$a_2 = c_1c_3 - 4c_4 \quad \text{[Formula 29]}$$

$$a_3 = 4c_2c_4 - c_3^2 - c_1^2c_4 \quad \text{[Formula 30]}$$

As aforementioned, once the azimuth angle (φ) and the elevation angle (θ) for rotating the body 30 are determined, the moving distance ($l_1$) of the pitch axis piston 42 can be obtained.

The γ is defined as the following formula 31 with reference to the aforementioned formulas 7 to 11 and the $l_1$.

$$\gamma = \phi - \tan^{-1}\left(\frac{(p_1 + l_1 d_{p1})\sin\phi\cos\theta - (p_2 + l_1 d_{p2})\sin\theta}{(p_1 + l_1 d_{p1})\cos\phi}\right) \quad \text{[Format 31]}$$

Since the $l_1$ and the rotation angle (γ) centering around the roll axis have been obtained, the moving distance ($l_2$) of the yaw axis piston 52 ($l_2$) can be obtained as follows. Since the length (L) of the yaw axis connecting rod 53 is constant, the following formula 32 is obtained.

$$|\vec{YJ_Y}^G|^2 = L^2 \quad \text{[Formula 32]}$$

Herein, the superscript G denotes the G coordinate system. The formula 32 can be vector-calculated as the formula 33.

$$|\vec{EJ_Y}^G - \vec{EY}^G|^2 = L^2 \quad \text{[Formula 33]}$$

Since the $\vec{EJ}^G$ has been rotated by the φ, the θ, and the γ of the $\vec{EJ_{Y0}}^G$, it is defined as the following formula 34.

$$\vec{EJ_Y}^G = \begin{pmatrix} \cos\phi & -\sin\phi & 0 \\ \sin\phi & \cos\phi & 0 \\ 0 & 0 & 1 \end{pmatrix} \begin{pmatrix} \cos\theta & 0 & \sin\theta \\ 0 & 1 & 0 \\ -\sin\theta & 0 & \cos\theta \end{pmatrix} \quad \text{[Formula 34]}$$

$$\begin{pmatrix} \cos\phi & \sin\phi & 0 \\ -\sin\phi & \cos\phi & 0 \\ 0 & 0 & 1 \end{pmatrix} \begin{pmatrix} \cos\gamma & -\sin\gamma & 0 \\ \sin\gamma & \cos\gamma & 0 \\ 0 & 0 & 1 \end{pmatrix} \vec{EJ_{Y0}}^G$$

The $\vec{EY}^G$ is defined as the following formula 35 by applying the $\vec{EY_0}^G$ and a unit vector $\vec{YD}^G$ of the yaw axis piston 52 in a direction that the yaw axis piston 52 moves.

$$\vec{EY}^G = \vec{EY_0}^G + l_2\vec{YD}^G \quad \text{[Formula 35]}$$

Herein, each of the vectors is defined as the following formula 36.

$$\vec{EJ_Y}^G = [j_{y1}, 0, j_{y2}]^T, \vec{YD}^G = [d_{y1}, 0, d_{y2}]^T, \vec{EY_0}^G = [y_1, 0, y_2]^T \quad \text{[Formula 36]}$$

Herein, the $j_{y1}$ and $j_{y2}$ denote the initial position of one end of the yaw axis connecting rod 53, and the $d_{y1}$ and $d_{y2}$ denote a unit vector of the yaw axis piston 52 in a direction that the yaw axis piston 52 moves.

The moving distance ($l_2$) of the yaw axis piston 52 is defined as the following formula 37 with reference to the formulas 31 to 36.

$$l_2 = \frac{-\alpha_2 - \sqrt{\alpha_2^2 - a\alpha_1\alpha_3}}{2\alpha_1} \quad \text{[Formula 37]}$$

Herein, the $\alpha_1$, $\alpha_2$ and $\alpha_3$ are defined as the following formulas 38, 39 and 40.

$$\alpha_1 = d_{y1}^2 + d_{y2}^2 \quad \text{[Formula 38]}$$

$$\alpha_2 = 2\{(y_1 - (j_{y1}(\cos\phi\cos\theta\cos(\phi-\gamma) + \sin\phi\sin(\phi-\gamma)) + j_{y2}(\cos\phi\sin\theta)))dy_1 + (y_2 - (j_{y1}(-\sin\theta\cos(\phi-\gamma)) + j_{y2}\cos\theta))dy_2\} \quad \text{[Formula 39]}$$

$$\alpha_3 = j_{y1}^2 + j_{y2}^2 + y_1^2 + y_2^2 - 2(j_{y1}(\cos\phi\cos\theta\cos(\phi-\gamma) + \sin\phi\sin(\phi-\gamma)) + j_{y2}(\cos\phi\sin\theta))y_1 - 2(j_{y1}(-\sin\theta\cos(\phi-\gamma)) + j_{y2}\cos\theta)y_2 - L^2 \quad \text{[Formula 40]}$$

As aforementioned, once the azimuth angle (φ) and the elevation angle (θ) for rotating the body 30 are determined, the moving distance ($l_1$) of the pitch axis piston 42 and the moving distance ($l_2$) of the yaw axis piston 52 can be calculated by the controller 90. The controller 90 controls the driving source 60 and the controlling valve 61 according to a result of the calculation. Accordingly, a driving force generated from the driving source 60 serves to operate the yaw axis piston 52 of the yaw axis driving unit 50 and the pitch axis piston 42 of the pitch axis driving unit 40. Accordingly, the body 30 is rotated by the φ and the θ.

A hydraulic pump was implemented as the driving source 60 in the present invention. However, various driving sources such as a pneumatic pump or an electric pump may be implemented. The driving source 60 is electrically connected to the controller 90 to receive a control signal from the controller 90. When the pitch axis driving unit 40 and the yaw axis driving unit 50 are operated by an electric force, the driving source 60 may not be provided.

The controlling valve 61 serves to selectively transmit the driving force generated from the driving source 60 to the pitch axis cylinder 41 and the yaw axis cylinder 51. One side of the controlling valve 61 is connected to the driving source 60, and another side thereof is connected to the pitch axis cylinder 41 and the yaw axis cylinder 51. When the pitch axis driving unit 40 and the yaw axis driving unit 50 are operated by an electric force, the controlling valve 61 may not be provided.

An unexplained reference numeral 100 denotes a memory, in which an algorithm for calculating each moving distance of the pitch axis piston 42 and the yaw axis piston 52, etc. is stored.

As aforementioned, in the present invention, the yaw axis driving unit and the pitch axis driving unit serve to rotate the body, and serve to restrict the body from rotating centering around the roll axis fixed to the body. Accordingly, the conventional roll rotation restricting link disposed between the body and the fixing part is not required.

As the roll-rotation restricting link is not needed, the number of assembly processes is decreased and an entire size of the apparatus is reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An apparatus for driving a body with 3-degrees of freedom angular motion, comprising:
    the body connected to a fixing part to be rotatable centering around a pitch axis, a yaw axis, and a roll axis;
    a pitch axis driving unit for rotating the body centering around the pitch axis; and
    a yaw axis driving unit for rotating the body centering around the yaw axis,
    wherein at least one of the pitch axis driving unit and the yaw axis driving unit restricts the body from rotating centering around the roll axis fixed to the body,
    wherein the pitch axis driving unit restricts the body from rotating centering around the roll axis fixed to the body, and
    wherein the pitch axis driving unit comprises:
    a pitch axis cylinder fixed to the fixing part;
    a pitch axis piston reciprocatingly disposed at the pitch axis cylinder; and
    a pitch axis connecting rod having one end connected to the body to restrict the body from rotating centering around the roll axis fixed to the body, and another end connected to the pitch axis piston by a ball joint.

2. The apparatus of claim 1, wherein one end of the pitch axis driving unit is connected to the body to rotate the body only centering around a rotation axis parallel with the pitch axis.

3. The apparatus of claim 1, wherein the one end of the pitch axis connecting rod is connected to the body by a revolution joint.

4. The apparatus of claim 3, wherein the yaw axis driving unit comprises:
    a yaw axis cylinder fixed to the fixing part;
    a yaw axis piston reciprocatingly disposed at the yaw axis cylinder; and
    a yaw axis connecting rod having both ends respectively connected to the body and the pitch axis piston by a ball joint.

5. The apparatus of claim 4, wherein a pitch axis bracket to which the revolution joint is connected, and a yaw axis bracket to which the ball joint of one end of the yaw axis connecting rod is connected are provided at the body.

6. The apparatus of claim 5, wherein the pitch axis bracket and the yaw axis bracket are disposed on an outer circumferential surface of the body to be spaced from each other by 90° on the basis of the roll axis.

7. The apparatus of claim 6, wherein the pitch axis connecting rod and the yaw axis connecting rod projected to a plane perpendicular to the roll axis are disposed to have an angle of 90° therebetween.

8. The apparatus of claim 7, wherein the fixing part comprises:
    a first fixing part for fixing the body; and
    a second fixing part fixed to the first fixing part, and having the pitch axis driving unit and the yaw axis driving unit.

9. The apparatus of claim 8, wherein the second fixing part is provided with a cavity for receiving the body.

10. The apparatus of claim 1, wherein the body is connected to the fixing part by a ball-socket joint.

11. The apparatus of claim 1, wherein the body is implemented as a nozzle for a flying object.

12. An apparatus for driving a body with 3-degrees of freedom angular motion, comprising:
    the body connected to a fixing part to be rotatable centering around a pitch axis, a yaw axis, and a roll axis;
    a pitch axis driving unit for rotating the body centering around the pitch axis;
    a yaw axis driving unit for rotating the body centering around the yaw axis, wherein at least one of the pitch axis driving unit and the yaw axis driving unit restricts the body from rotating centering around the roll axis fixed to the body;
    a driving source;
    a controlling valve for selectively transmitting a driving force generated from the driving source to the pitch axis driving unit and the yaw axis driving unit; and
    a controller for controlling the driving source and the controlling valve to rotate the body to a preset position by the pitch axis driving unit and the yaw axis driving unit.

13. An apparatus for driving a body with 3-degrees of freedom angular motion, comprising:
    a driving source;
    the body connected to a fixing part by a ball-socket joint to be rotatable centering around a pitch axis, a yaw axis, and a roll axis;
    a pitch axis driving unit for rotating the body centering around the pitch axis, and restricting the body from rotating centering around the roll axis fixed to the body;
    a yaw axis driving unit for rotating the body centering around the yaw axis;

a controlling valve connected to the driving source for selectively transmitting a driving force generated from the driving source to the pitch axis driving unit and the yaw axis driving unit; and a controller for controlling the driving source and the controlling valve to rotate the body to a preset position by the pitch axis driving unit and the yaw axis driving unit.

14. The apparatus of claim 13, wherein the pitch axis driving unit comprises:

a pitch axis cylinder fixed to the fixing part, and connected to the controlling valve to receive a driving force;

a pitch axis piston reciprocatingly disposed at the pitch axis cylinder; and a pitch axis connecting rod having one end connected to a pitch axis bracket disposed on an outer circumferential surface of the body by a revolution joint to restrict the body from rotating centering around the roll axis fixed to the body, and another end connected to the pitch axis piston by a ball joint.

15. The apparatus of claim 14, wherein the yaw axis driving unit comprises:

a yaw axis cylinder fixed to the fixing part, and connected to the controlling valve to receive a driving force;

a yaw axis piston reciprocatingly disposed at the yaw axis cylinder; and a yaw axis connecting rod having one end connected to a yaw axis bracket disposed at the body by a ball joint, and another end connected to the pitch axis piston by a ball joint.

16. The apparatus of claim 13, further comprising:

a first sensor for sensing a position of the pitch axis piston and outputting to the controller; and a second sensor for sensing a position of the yaw axis piston and outputting to the controller, wherein the controller controls the driving source and the controlling valve based on the position information outputted from the first sensor and the second sensor.

17. The apparatus of claim 13, wherein the driving source is implemented as a hydraulic pump.

\* \* \* \* \*